Figure 9:
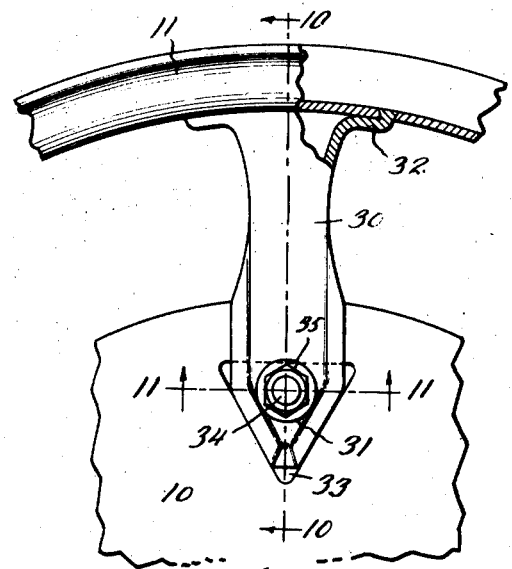

May 10, 1927.  J. H. WAGENHORST  1,628,626
VEHICLE WHEEL
Filed July 17, 1924    6 Sheets-Sheet 1
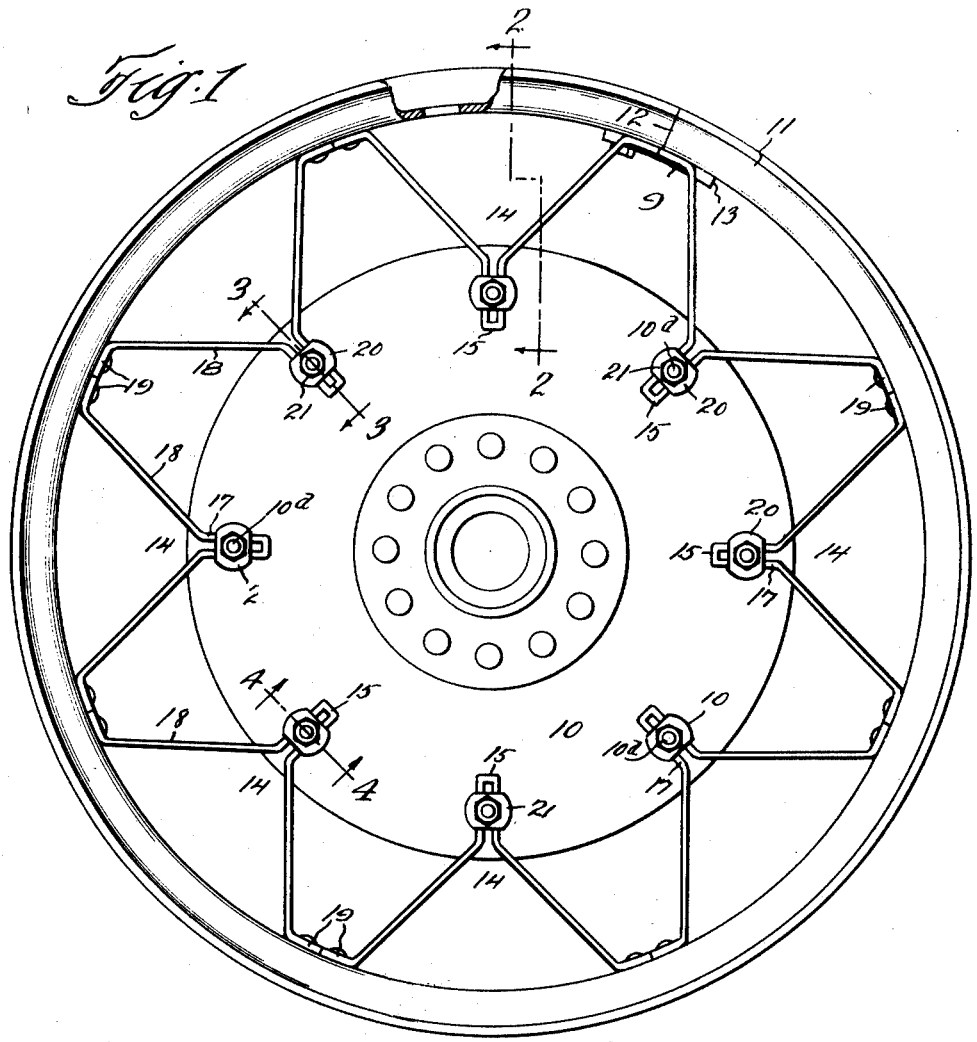
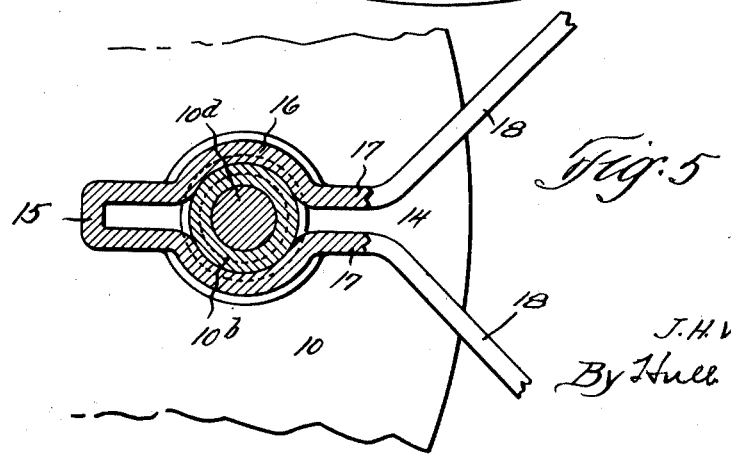
Inventor
J. H. Wagenhorst
By Hull, Brock & West
Attys.

May 10, 1927.　　　　J. H. WAGENHORST　　　　1,628,626
VEHICLE WHEEL
Filed July 17, 1924　　　6 Sheets-Sheet 2
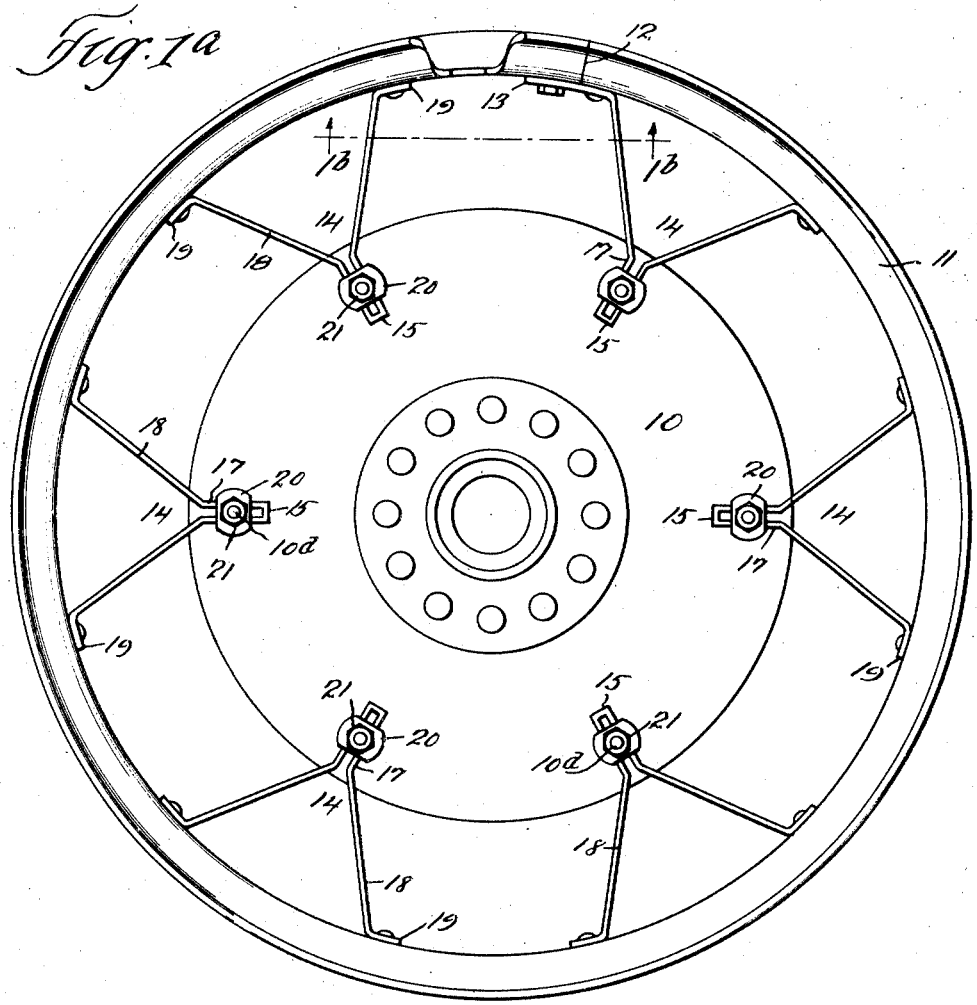
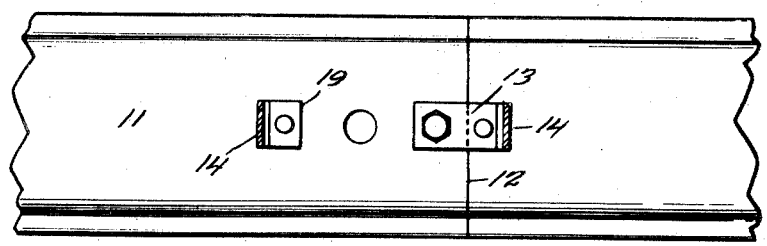
Inventor
J. H. Wagenhorst
By Hull, Brock & West
Attys.

May 10, 1927.                                                             1,628,626
J. H. WAGENHORST
VEHICLE WHEEL
Filed July 17, 1924        6 Sheets-Sheet 3
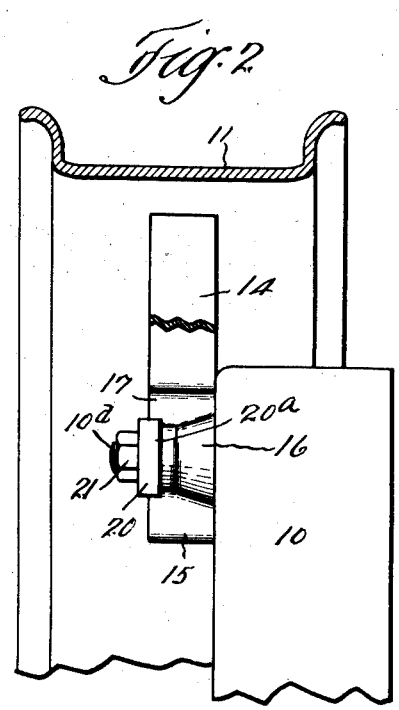
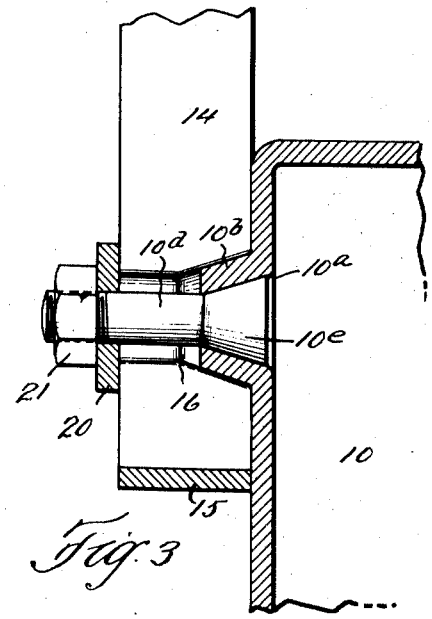
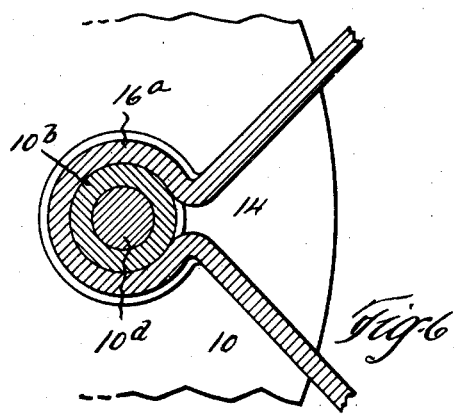
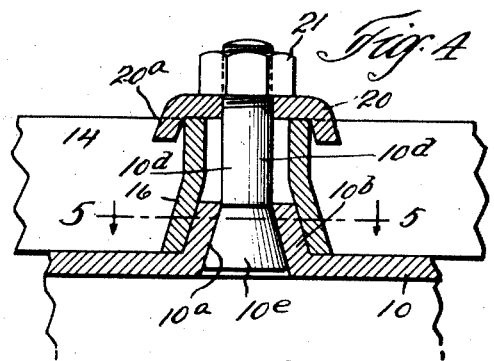
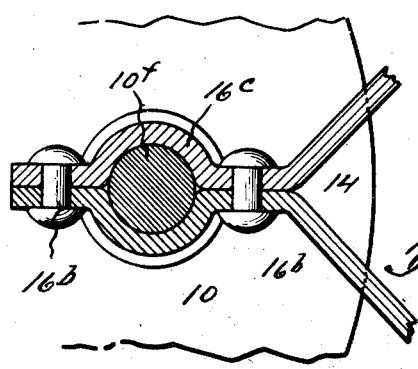
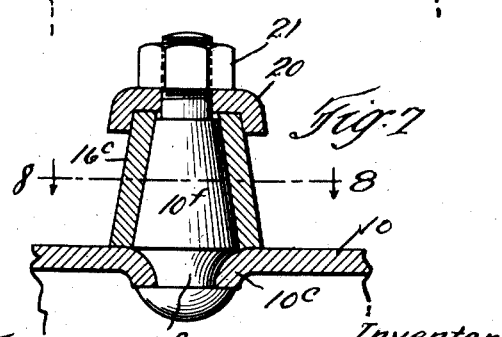
Inventor
J. H. Wagenhorst
By Hull, Brock &West
Attys.

May 10, 1927.

J. H. WAGENHORST 1,628,626

VEHICLE WHEEL

Filed July 17, 1924

6 Sheets-Sheet 4

Inventor
J. H. Wagenhorst
By Hull, Brock & West
Attys.

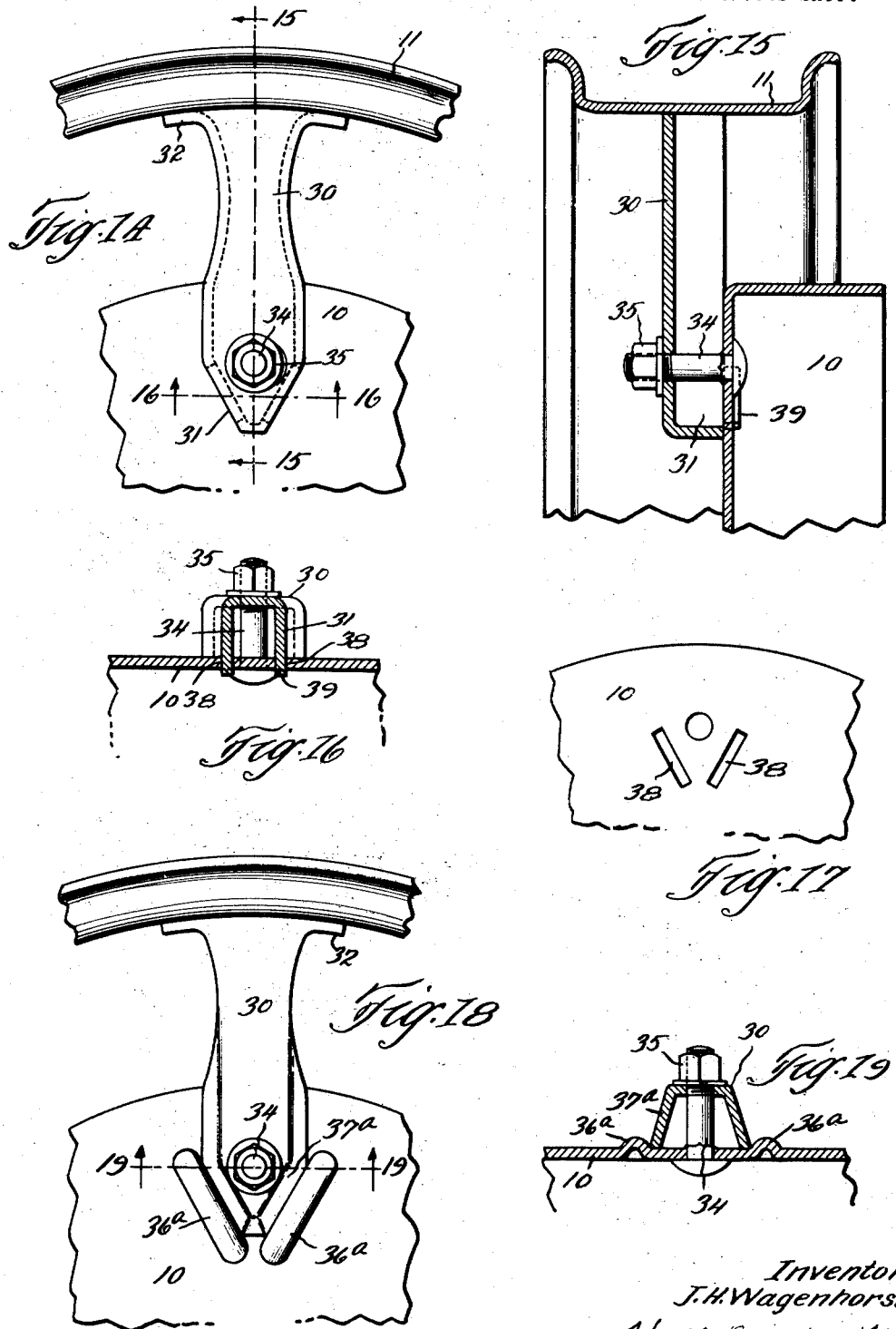

May 10, 1927.  J. H. WAGENHORST  1,628,626
VEHICLE WHEEL
Filed July 17, 1924    6 Sheets-Sheet 6
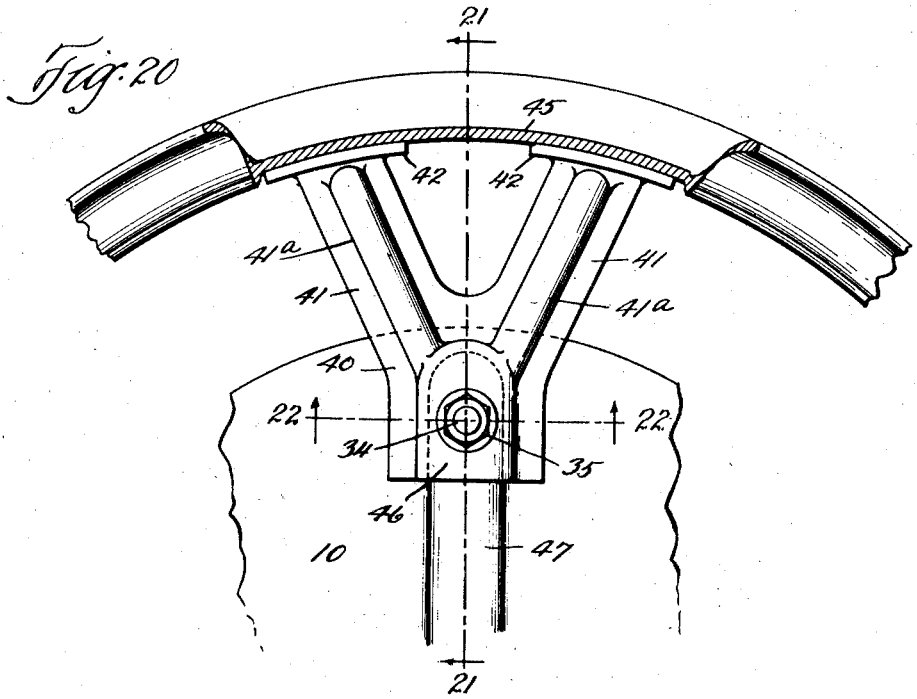
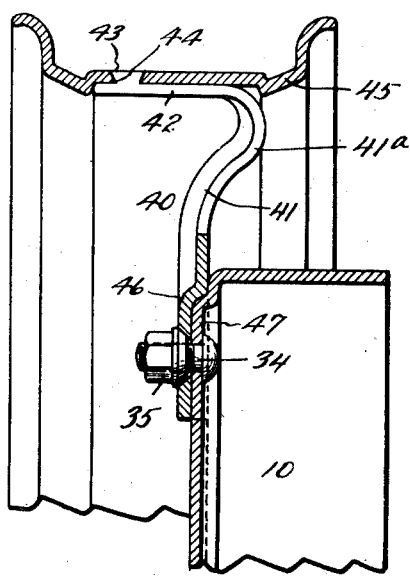
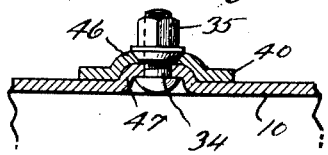
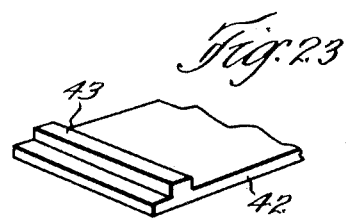
Inventor
J. H. Wagenhorst
By Hull, Brock & West
Attys.

Patented May 10, 1927.

1,628,626

UNITED STATES PATENT OFFICE.

JAMES H. WAGENHORST, OF JACKSON, MICHIGAN.

VEHICLE WHEEL.

Application filed July 17, 1924. Serial No. 726,529.

This invention relates to vehicle wheels and has to do more particularly with wheels for automobiles. The chief object of my present invention is to provide a wheel which is adapted to carry a pneumatic tire and which may be manufactured at a comparatively low cost and in which the weight of the wheel is kept comparatively low.

With the introduction and widespread use of balloon tires there has been a considerable reduction in the diameter of the rims used in automobiles. With the introduction and use of four-wheel brakes, brake drums are associated with all four wheels. The use of front wheel brakes has increased the unsprung weight on the front axle, due both to the weight of the brake drum and its fixtures and also to the increase in weight of the front axle necessary to strengthen it against the torque imposed by the front wheel braking action.

The object of this invention is to decrease the weight and cost of the wheels by utilizing the brake drum as a part of the wheel body, the decrease in diameter of the rim, due to the use of balloon tires or tires of larger sectional area than have been customarily used heretofore on automobiles of similar class, having increased the strength of the rim against radial distortion, so that it is no longer imperative to provide the sort of felly support that has been used heretofore. The decrease in the diameter of the rim also brings the rim much closer radially to the brake drum, so that the massive spoke and hub structures heretofore commonly used are no longer necessary.

In carrying out my invention, I propose to provide a rim having members permanently attached thereto, which members may be detachably connected individually to the brake drum and which serve to transmit load, torque and side thrust from the rim to the brake drum and vice versa. I propose to provide a series of spoke-like members for this purpose which are connected at various points to the rim and may be detachably connected to the brake drum, and I find that this invention is peculiarly adaptable for use in connection with a trans-split rim, inasmuch as, when the members carried by the rim are disconnected from the brake drum they permit the rim to be flexed or distorted either helically or circumferentially for the purpose of removing a pneumatic tire from the rim or placing one thereon. The result is that the wheel body is comparatively light and can be manufactured at a very low cost.

The adoption of front wheel brakes has increased the unsprung weight on the front axle, due to the brake drums and the increase in strength of the front axle, but, according to my invention, this increase in unsprung weight is compensated for by a marked decrease in weight of the wheel body, and in the case of the rear axle, the total unsprung weight has been decreased, due to the fact that it is now possible, due to the similar conditions at front and rear, to utilize a much lighter wheel body on the rear axle.

With these objects in view, and certain others which will become apparent as the description proceeds, the invention consists in the novel features of construction and in the manner of combining or arranging the same, all of which will be fully described hereinafter and set forth in the appended claims.

Figure 10:
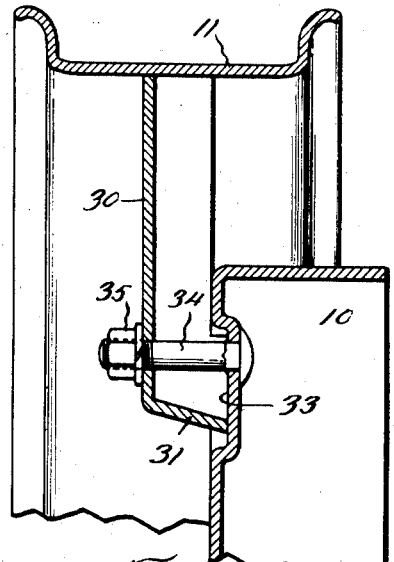
Figure 12:
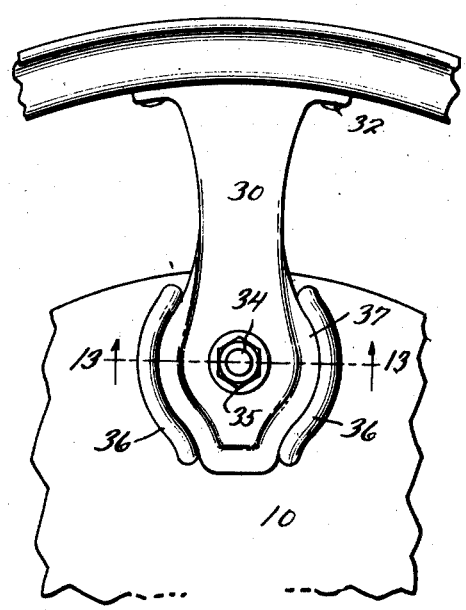
Figure 11:
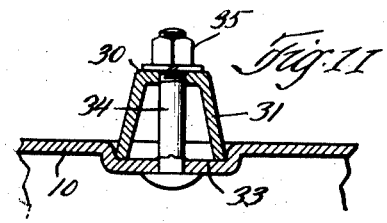
Figure 13:
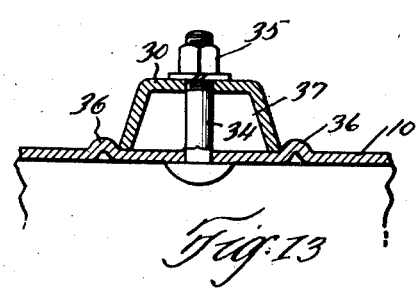

In the drawings forming a part of this specification, Fig. 1 is a side view of one form of wheel embodying my invention; Fig. 1ª is a similar view showing a very slight modification; Fig. 1ᵇ is a sectional plan on the line 1ᵇ—1ᵇ of Fig. 1ª; Fig. 2 is a sectional elevation on the line 2—2 of Fig. 1; Fig. 3 is a sectional view on the line 3—3 of Fig. 1; Fig. 4 is a sectional view on the line 4—4 of Fig. 1; Fig. 5 is a section on the line 5—5 of Fig. 4; Fig. 6 is a section showing a modification of Fig. 5; Fig. 7 is a sectional view showing a modified form of Fig. 4; Fig. 8 is a section on the line 8—8 of Fig. 7; Fig. 9 is a view showing a somewhat different construction of spoke; Fig. 10 is a section on the line 10—10 of Fig. 9; Fig. 11 is a section on the line 11—11 of Fig. 9; Fig. 12 is a view showing a slight modification of spoke; Fig. 13 is a section on the line 13—13 of Fig. 12; Fig. 14 is a view showing a further modification; Fig. 15 is a sectional view on the line 15—15 of Fig. 14; Fig. 16 is a section on the line 16—16 of Fig. 14; Fig. 17 is a detail of the drum shown in Figs. 14, 15 and 16; Fig. 18 is an elevation of another modified form of spoke; Fig. 19 is a section on the line 19—19 of Fig. 18; Fig. 20 is a view showing still another style of spoke; Fig. 21 is a sectional view on the line 21—21 of Fig. 20; Fig. 22 is a section on the line 22—22 of Fig. 20; and Fig. 23 is a detail of the outer end of spoke shown in Fig. 21 prior to the application of said spoke and its attachment to the rim.

In making up a wheel body in accordance with my invention I employ a brake drum 10 fastened to a hub in the usual way and a sheet metal rim 11.

This rim is shown split transversely at 12 in Figs. 1, 1$^a$ and 1$^b$ and is connected by a bridge plate 13. The rim 11 can be straight side or clencher, and may have a drop base or central depressed portion, and if desired can be made with a groove to receive a detachable side flange ring. Any type of bridge or connecting plate can be employed but if desired one end of a spoke can be used for the bridge plate as more particularly shown in Figs. 1$^a$ and 1$^b$.

The brake drum 10 is of the usual size but the rim 11 is of a somewhat smaller diameter than rims heretofore used, this rim illustrated being intended for use with balloon tires. It will be understood, however, that the rim can be any size desired and usable with any type of tire.

The rim 11 and brake drum 10 are connected by spokes made of strip metal but of various designs, and these spokes may be considered lugs for demountably connecting the rim and brake drum.

In Figs. 1 to 8 inclusive the spokes 14 are each made from a strip of metal bent centrally upon itself at 15 and secured at the bend to the brake drum, as more fully described hereinafter, and attached at its outer ends to the inner face of the base of the rim, the split in the rim always occurring between two spokes.

In Figs. 9–19 inclusive, the spokes 30 (in several forms) are punched from sheet metal but are still of strip metal construction, and in Figs. 20–23 the spokes 40 are blanked from a sheet of metal and are forked or bifurcated, but this type of spoke may also be termed a strip metal spoke.

In the form shown in Figs. 1 to 5 the strip of metal is bent at 15 and then rounded at 16, brought into parallel relation at 17, then diverged at 18 and the ends 19 shaped to contact with the rim base, where they are riveted or otherwise secured.

There may be as many of these spokes 14 as desired and in Fig. 1 I have shown eight while in Fig. 1$^a$ only six are employed.

The brake drum 10 has holes 10$^a$ punched in the face of the drum, these holes being punched from the inside outwardly and the metal may be drawn outwardly as at 10$^b$ in Figs. 3 and 4. In Fig. 7 the drum is the drum is punched from the outside inwardly and the metal drawn in as shown at 10$^c$.

Bolts 10$^d$ with conical heads 10$^e$ are fitted in the outwardly drawn socket 10$^b$ while bolts 10$^f$ have their heads 10$^g$ riveted in the opening 10$^c$.

The curved portions 16 fit around the exterior of the socket 10$^b$ and around the conical bolt 10$^f$ (Fig. 7) and a cap 20 is fitted upon the protruding end of the bolt and a nut 21 applied to secure the parts together, the caps 20 having overlapping ends 20$^a$ to embrace the adjacent portions of the spokes.

In Fig. 6 the curve 16$^a$ is at the center of the spoke, while in Fig. 8 the spoke is made up of two pieces riveted together at 16$^b$ providing the socket portion 16$^c$. In other respects the spokes are the same.

In Fig. 1 the spoke ends contact upon the inner face of the rim base, while in Fig. 1$^a$ the ends are spaced apart, but the spoke ends are always spaced apart at one point at least and the split in the rim is always located between the points at which adjacent spoke ends are connected to the rim.

The inner edges of the spokes in all forms described, contact with the outer face of the brake drum, and obtain a firm bearing thereon due to the binding effect of the cap plate and nut and also to the tapered bearing on the conical bolts or outdrawn sockets.

In each case there is a firm and rigid connection between the inner ends of the spokes and the brake drum. Owing to the shape of the spoke and the manner of connecting the same, it will have a limited amount of radial resiliency and yet be very strong to resist lateral strains. It is obvious that one or more spokes can be readily removed and replaced, without impairing the remainder of the wheel body.

It will also be understood that the spokes can be readily demounted from the brake drum or central member when it is desired to split the rim to remove a tire.

In the forms shown in Figs. 9–19 the same general idea is carried out; that is rigid connection at one point at the inner end of spoke and spaced connections at the outer end and a limited amount of resiliency in the spoke, and easy demountability.

The spoke 30 is punched from sheet metal and has a tapered inner end 31 and spread outer ends 32, and is substantially U-shaped in cross section, at least at the inner end, and this tapered inner end fits into a correspondingly shaped recess or depression 33 pressed in the outer face of the brake drum. Bolts 34 pass through the drum and spoke and receive the nuts 35 with washers beneath. The outer ends 32 are secured in any suitable manner such as riveting or welding. When the nuts are drawn up tightly the tendency is to spread the tapered end 31 of the strip sheet metal spoke and bind the same firmly in the recess or depression 33.

In Figs. 12 and 13 I show curved ribs 36 punched outwardly from the face of the brake drum and the inner end of the spoke is curved or bulged as well as tapered as shown at 37. The same type of bolts 34 and nuts 35 are employed and the cooperative relation and action of the parts is exactly the same.

In Figs. 14, 15, 16 and 17 the brake drum 10 is shown formed with oblique and converging slots 38 into which the projecting lugs 39 (of the tapered end 31) fit and the same bolts 34 and nuts 35 are employed to bind the parts together.

In the form shown in Figs. 18 and 19 the ribs 36$^a$ are straight instead of curved and the taper 37$^a$ is shaped to conform. The same bolts and nuts are also employed here and in all respects the interlocking of the inner ends of the spokes with the brake drum is accomplished in substantially the same manner, as the various elements are the same in function though differing slightly in contour.

In the type shown in Figs. 14 and 15 the ends of the spokes can be left open or closed as preferred.

A spoke constructed as shown in Figs. 9-19 is light and easily attached and yet is strong to resist both lateral strains and torque.

In Figs. 20-23 I have shown a spoke 40 having diverging members 41, which are turned laterally as shown at 42 and each end is preferably formed with a rivet lug 43 which projects through an opening 44 in the rim base 45 which in this instance is inrolled to receive the projecting ends 42 of the spoke members 41. The members 41 are reinforced by longitudinal corrugations 41$^a$.

The inner end of each spoke has a recess or depression 46 punched or pressed therein to fit upon the correspondingly shaped protruding portion 47 punched or pressed from the outer face of the brake drum and this rib or protrusion 47 may extend to the center of the drum. The corrugations and depressions in the spokes greatly strengthen them and the protruding ribs on the brake drum also give it greater rigidity. Bolts 34 and nuts 35 complete the connection between the spoke ends and brake drum.

This type of spoke has great strength, withstanding lateral strains and torque and still it has a limited amount of radial resiliency. It is also obvious that one or more spokes of this type can be removed and replaced without disturbing the other spokes. The spokes in all cases are comparatively short and are rigidly connected at their outer ends to the rim, and demountably connected at their inner ends to the brake drum or central member, and by this construction a trans-split rim can be separated and flexed in order to remove and replace a tire. The spokes in function and operation are like fastening lugs permanently attached to the rim.

From the foregoing description taken in connection with the accompanying drawings, it will be seen that I provide a cheap, simple and durable type of automobile wheel, involving few parts and capable of carrying out successfully all of the objects hereinbefore recited.

Certain constructions disclosed and covered by some of the claims of this patent are disclosed and specifically claimed in my copending applications for improvements in vehicle wheels, Serial Nos. 180,476, 180,477, and 180,478, filed April 2d, 1927, as divisions of this application.

Having thus described my invention, what I claim is:—

1. A wheel comprising the combination of a brake drum, a plurality of threaded studs carried by and projecting from the side wall of said brake drum, a tire carrying rim, a plurality of spoke members secured to the base of said rim and extending radially inward therefrom, said studs extending through the inner ends of the spoke members, and nuts screwed on said studs and clamping said spoke members against said brake drum.

2. A wheel comprising the combination of a brake drum, a tire carrying rim having a plurality of spoke members secured thereto and extending radially inward therefrom, and means for demountably attaching said rim to said brake drum including studs carried by the drum and projecting through said spoke members, and nuts screwed on said studs and clamping said spoke members against the brake drum.

3. A wheel comprising a brake drum, a tire carrying rim, and means for demountably attaching said rim to the drum and for transmitting load, side thrust and torque from rim to drum, including a plurality of spoke members rigidly secured to the rim and detachably connected to the brake drum.

4. A wheel comprising the combination of a brake drum, a tire carrying rim transversely split at one point and having a plurality of spoke members secured thereto and extending radially inward therefrom, and means for demountably attaching said rim to said brake drum including studs carried by the drum and projecting through said spoke members, and nuts screwed on said studs and clamping said spoke members against the brake drum.

5. A wheel comprising a brake drum, a tire carrying rim, and means for demountably attaching said rim to the drum and for transmitting load, side thrust and torque from rim to drum, including a plurality of spoke members rigidly secured to the rim, a plurality of threaded studs carried by and projecting from the brake drum and extending through the inner ends of said spoke members, and nuts screwed on said studs and engaging said spoke members to clamp the same against the drum.

6. A wheel comprising the combination of a brake drum, a plurality of threaded studs carried by and projecting through the side wall of said brake drum, a tire carrying rim, a plurality of strip metal spoke members each comprising a pair of diverging legs having feet at their outer ends engaging the base of said rim and riveted thereto, the inner ends of said legs merging into a loop embracing one of said studs, and nuts screwed on said studs and clamping said loops against the side wall of the brake drum.

7. A wheel comprising the combination of a brake drum, a plurality of threaded studs carried by and projecting through the side wall of said brake drum, a tire carrying rim, a plurality of strip metal spoke members each comprising a pair of diverging legs having feet at their outer ends engaging the base of said rim and riveted thereto, the inner ends of said spoke members engaging said studs, and nuts screwed on said studs and clamping the inner ends of said spoke members against the side wall of the brake drum.

8. A wheel comprising the combination of a brake drum, a plurality of threaded studs carried by and projecting through the side wall of said brake drum, a tire carrying rim, a plurality of strip metal spoke members having feet at their outer ends engaging the base of said rim and riveted thereto, the inner ends of said spoke members engaging said studs, and nuts screwed on said studs and clamping said spoke members against the side wall of the brake drum.

9. A wheel comprising the combination of a brake drum having a plurality of protuberances formed thereon, a plurality of threaded studs carried by and projecting through the side wall of said brake drum said studs being located adjacent said protuberances, a tire carrying rim, a plurality of strip metal spoke members having feet at their outer ends engaging the base of said rim and riveted thereto, the inner ends of said spoke members engaging said studs and seating on the protuberances of said brake drum, and means for clamping said inner ends of said spoke members against the side wall of the brake drum.

10. A wheel comprising the combination of a brake drum having a plurality of conical projections formed thereon, a plurality of threaded studs carried by said brake drum and extending through said conical projections, a demountable tire carrying rim, a plurality of strip metal spoke members rigidly secured to the base of said rim and extending radially inward therefrom, said spoke members comprising diverging legs having their inner ends formed to be clamped about the conical projections on said brake drum, a clamping plate engaging one edge of said spoke members and nuts screwed on said studs and engaging said clamping plate to clamp the spoke members against the side wall of the drum and in seating contact with said projections thereon.

In testimony whereof, I hereunto affix my signature.

JAMES H. WAGENHORST.